Aug. 2, 1960

W. KASTEN 2,947,419

FILTER AND METHOD OF MAKING

Filed May 26, 1955

INVENTOR.
WALTER KASTEN.
BY
*Robert C. Smith*
ATTORNEY

Aug. 2, 1960

W. KASTEN 2,947,419

FILTER AND METHOD OF MAKING

Filed May 26, 1955

INVENTOR.
WALTER KASTEN
BY
William N. Antonis

ATTORNEY.

United States Patent Office 2,947,419
Patented Aug. 2, 1960

2,947,419

FILTER AND METHOD OF MAKING

Walter Kasten, Royal Oak, Mich., assignor to Bendix Aviation Corporation, South Bend, Ind., a corporation of Delaware Filed May 26, 1955, Ser. No. 511,387

12 Claims. (Cl. 210—435)

The present invention relates to filters and more particularly to a material and a combination of materials for filter and/or demulsifying elements and to a method of making said elements.

One of the principal objects of the present invention is to provide a filter structure utilizing material especially adapted for impingement type filtration, which can be repeatedly cleaned without appreciably decreasing its filtering capacity and which retains its shape and structure in both the filtration and cleaning operations.

Another object of the invention is to provide a compound filter element in which one type or size of foreign material is removed by one element and another type or size of foreign material is removed by another element.

Another object is to provide a method of making the aforesaid elements for use in either filter or demulsifying operations.

Other objects and advantages will become apparent from the following description and accompanying drawings, wherein.

Figure 1:
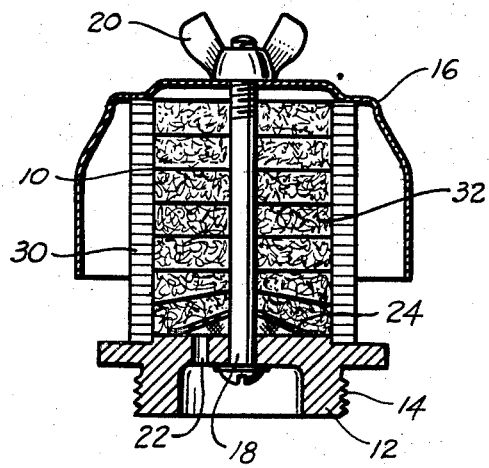
Figure 1 is a vertical cross-sectional view through a filtering device adapted to filter air.

Referring more specifically to the drawings and to Figure 1 in particular, a compound filter element 10 is mounted on base 12 which is shown with a screw threaded portion 14 for mounting the device on an air intake of a hydraulic fluid, fuel or oil reservoir. A cup-shaped air deflector 16 encloses most of the filter element and is secured in place, along with the element, by a stem 18 extending through the base 12 longitudinally through the element and through a hole in the center of deflector 16. A winged nut 20 is provided on the deflector end of the stem so that the unit can be readily disassembled for cleaning. When the filtering device is assembled the end of the deflector closes one end of the filter element and the base closes the other end except for a port 22 which connects the interior of the element with the passage leading into the reservoir or the like. A conical screen 24 forms a drainage chamber to connect the filter element with port 22.

The filter element shown in Figure 1 consists of two principal members, the outer element 30 being an edge type filter member and the inner element 32 being an impingement type member. The outer element is preferably self-supporting and, as shown in Figure 1, consists of a plurality of washer-like layers, either as individual layers or as convolutions of a helically wound unit, having radial pores between each layer to provide passages for the fluid being filtered. The layers of the filter element may be of a fibrous material held together by a discontinuous bond so distributed that radial pores are formed between the layers at frequent intervals. The discontinuity of the bond may be controlled by using a paper or fibrous material having a predetermined rugosity on both surfaces thereof so that the valleys of the rugosities form the passages, and the peaks thereof form the points of contact between the adjacent layers. The paper or fibrous material is preferably treated with a thermosetting resinous material such as phenolic formaldehyde condensation product. After the elements treated with this material have been formed, they are heated to a temperature and for a time sufficient to cause the resinous material to set, making the material forming the elements but not the elements themselves, substantially impervious to fluid, the pores between the layers remaining open after the treatment. The foregoing filter element and a method of making the element are covered by my United States Patent No. 2,421,704, dated June 3, 1947.

The inner element 32 is composed of a mass of nylon fibers treated with a thermosetting resin which bonds the fibers together at their points of contact so that the material so formed retains its structure and shape during operation of the filter and in cleaning. The inner element shown in Figure 1 consists of a plurality of washer-like layers cut from a flat sheet of the nylon fibrous material treated with the resinous material and stacked on stem 18. This material is particularly suitable for use under severe operating conditions, since the nylon fibers are resistant to abrasion by solid particles and corrosion by many chemicals such as alkalis, organic acids and common solvents such as carbon disulfide, benzol, alcohols, trichlorethylene and ketones. The resin bond prevents channeling, rupturing, shrinking and distortion. The density can be varied to suit requirements as to the size of the particles to be removed from the fluid. To clean the element, nut 20 and deflector 16 are removed from stem 18 and the element is lifted from the stem and base. Inner and outer elements are separated and cleaned independently. Since the washers of the inner element retain their shape they can be separated into individual layers and washed in a suitable solvent and then reassembled in the outer element.

Figure 2:
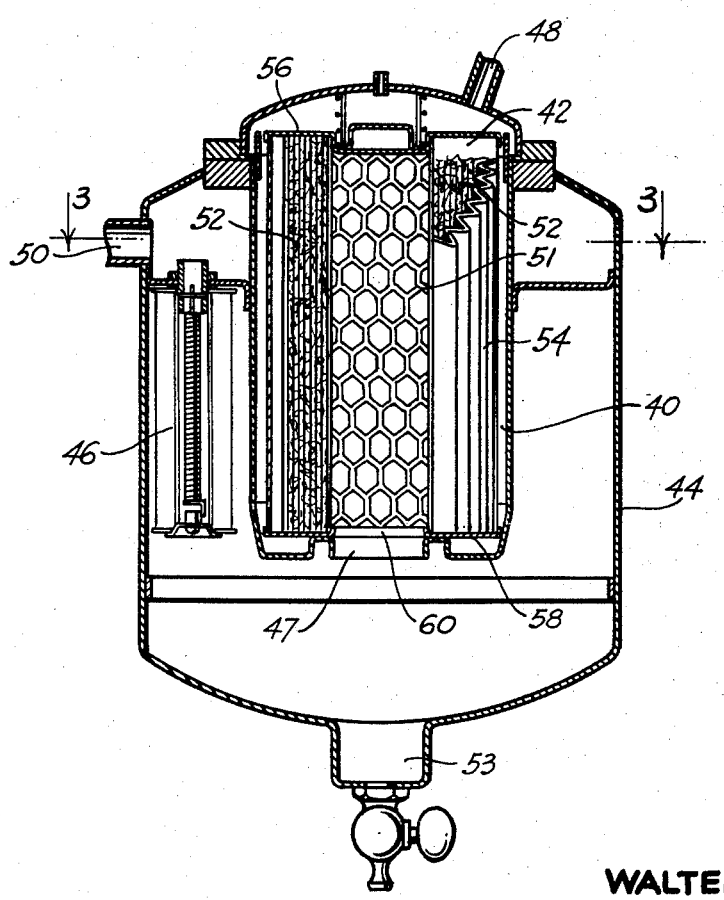
Figure 2 is a vertical cross-sectional view through a filtering and demulsifying device in which an element embodying the present invention is used.
Figure 3:
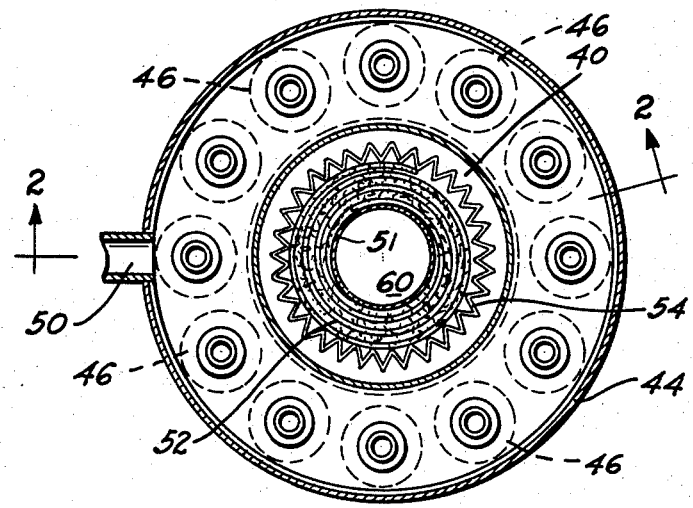
Figure 3 is a sectional view taken along line 3—3 of Figure 2.

The filtering and demulsifying device shown in Figures 2 and 3 consists of an internal chamber 40 in which is mounted an element 42 embodying the present invention and an external chamber 44 in which are mounted a plurality of filter elements 46 which may be either edge type or pleated elements, the two chambers being connected by a port 47. The fluid to be purified enters the device through an inlet passage 48 and chamber 40 and the purified fluid leaves through the external chamber 44 and outlet passage 50. The arrangement of the various chambers and elements contained therein is claimed in U.S. Patent No. 2,707,563, dated May 3, 1955, common assignee with this application. Element 42 has a rigid core 51 which may be constructed of expanded metal, as shown, or other perforate material, around which is wound a plurality of layers 52 of the nylon-resin material described in the preceding paragraph. This material functions principally as a demulsifying element to cause droplets of the contaminating fluid, which may be water, for example, to form from the moisture entrained in the continuous phase being purified, which may be fuel. These droplets then coalesce and descend to a sump 53 in the bottom of the device and the purified fuel passes through filter elements and leaves the unit through an outlet.

The nylon-resin material of the filter element is encased in a filter section 54 consisting of pleated paper treated with a thermosetting resin, which filters the fluid to eliminate a large percentage of the solid particles and gum from the fluid before it enters the nylon-resin material and thereby greatly extends the effective life of the said material. The filter section and nylon-resin material are sealed at their ends by end plates 56 and 58, end plate 58 containing a hole 60 to connect the hollow interior of the element with port 47 and thus with an external chamber.

Figures 4, 5:
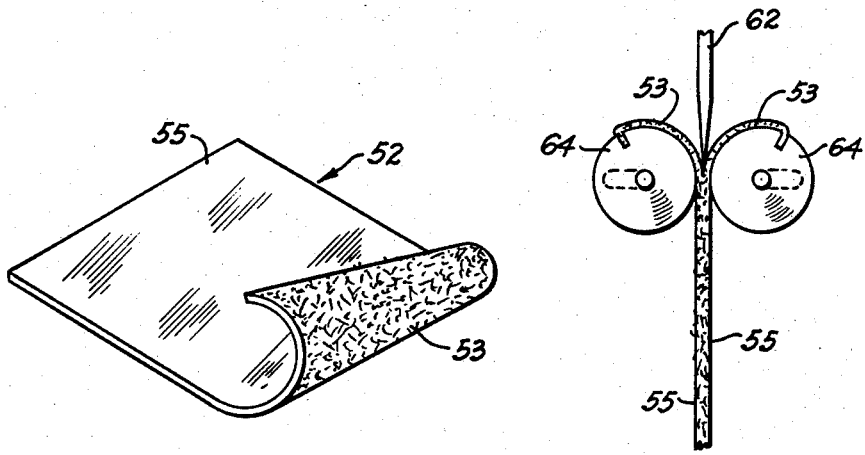
Figure 4 is a perspective view of a layer of nylon-resin material one side of which is smooth and the other side of which is fuzzy.
Figure 5 is a diagrammatic view showing a means of splitting a nylon-resin sheet of material to form a layer having the characteristics shown in Figure 4.

It has been found that the effectiveness of the nylon-resin material as a demulsifying agent can be greatly enhanced by splitting the sheet of material before it is wound around the core. Splitting the material produces a rather fuzzy surface 53 on one side thereof, as shown in Figure 4, which then contacts the smoother surface 55 of the preceding or following convolution. The outer surfaces of each sheet of nylon-resin material contain a larger percentage of resin. When two of these surfaces contact each other, the resistance to flow increases and the life of the demulsifier element is decreased. A method of making the material consists in forming a sheet of nylon fibers, treating the sheet with a resinous material such as phenolic condensation product, splitting the sheet so formed by pulling the sheet apart edgewise, as shown in Figure 5, by means of a knife-edged 62 and a pair of rollers 64 which may move apart as the material winds there around, and then stacking or otherwise assembling the split sheets into layers to form a structure as shown at 32 in Figure 1 or at 52 in Figures 2 and 3. Although a single sheet or layer can be used satisfactorily for certain filtering operations, it is usually desirable to have a plurality of layers.

While only two illustrations of my invention are disclosed herein, additional modifications and changes may be made without departing from the scope of the invention.

I claim:

1. In a filter, the combination of an inner element formed of layers of nylon resin fibrous material having one side which is relatively loosely packed and another side which is more tightly packed, said material being arranged in said layers so that the loosely packed side of each layer contacts the more tightly packed side of the adjacent layer, and resin impregnated paper filter material surrounding said inner element.

2. In a compound filter element, an inner filtering member comprising a plurality of layers of resin-impregnated nylon fibrous material having one side which is much more loosely packed than the other side, said material being arranged in said layers so that the loosely packed side of each layer contacts the more tightly packed side of the adjacent layer, and an outer filtering member of resin-impregnated paper surrounding said fibrous material.

3. A filter element comprising layers of resin-impregnated nylon fibrous material having one side which is much more loosely packed than the other side, said material being arranged in said layers so that the loosely packed side of each layer contacts the more tightly packed side of the adjacent layer.

4. A filter unit for use in filtering gaseous fluids comprising means for mounting said unit on an external member, a metal deflector cap and a filter element positioned within said cap, means for attaching said cap and said filter element to said mounting means, said filter element comprising a conical screen adjacent said mounting means, a plurality of stacked nylon fibrous discs, and a cylindrical edge-type element surrounding said screen and said discs.

5. A filter structure for use in a breather-filler cap assembly comprising a vented plate and means for attaching said plate to an external member, a conical screen adjacent said vented plate, a stack of annular nylon fibrous discs, a cylindrical edge-type element surrounding said screen and said discs, a metal deflector covering a substantial portion of said element, and a threaded member passing through the center of said discs, said deflector, and said vented plate for fastening said assembly together.

6. A filter structure for use in a breather-filler cap assembly comprising a vented plate and means for attaching said plate to an inlet pipe, a conical screen adjacent said vented plate, a stack of annular nylon fibrous discs adjacent said screen, a cylindrical edge-type element surrounding said screen and said discs, a cup-shaped air deflector enclosing a substantial portion of said edge-type element, and means for fastening said assembly together.

7. A filter structure as set forth in claim 6 wherein said nylon fibrous discs are cut from material which has been split edgewise to produce a mat having one side which is much more loosely packed than the other side.

8. An apparatus for removing contaminants from a liquid comprising an outer casing, an inner casing spaced from the sidewall and bottom of said outer casing and connected with said outer casing through an opening in the lower end thereof, a liquid inlet passage communicating with said inner casing, a liquid outlet passage in said outer casing, a filter-demulsifier unit in said inner casing interposed between said inlet passage and the bottom of said casing, said unit comprising a perforated cylindrical core member, a demulsifier element comprising a plurality of layers of nylon-resin material which has been split edgewise to produce a mat having one side which is more loosely packed than the other, said material being wrapped around said core and arranged in said layers so that the loosely packed side of each layer contacts the more tightly packed side of the adjacent layer, and a pleated resin-impregnated filter element surrounding said demulsifier element, an annular shelf attached to the interior sidewall of said outer casing, and a plurality of filter elements attached to said shelf in communication with said liquid outlet passage.

9. A method of making a filter element comprising splitting a sheet of nylon fibrous material edgewise to form a mat having one side which is much more loosely packed than the other side, cutting said split sheets into annular washer-like sections, and assembling said sections axially to form a cylindrical unit.

10. A method of making a filter element as set forth in claim 9 wherein said cylindrical unit is assembled within the hollow interior of a cylindrical edge-type unit.

11. A device for separating liquid and solid contaminants from a liquid comprising a casing having a fluid inlet passage and a fluid outlet passage, a filter-demulsifier element in said casing including a perforated core, a plurality of layers of nylon-resin material wrapped around said core, said material having one side which is more loosely packed than the other side and being arranged in said layers so that the loosely packed side of each layer contacts the more tightly packed side of the adjacent layer, and a pleated resin-impregnated filter element surrounding said demulsifier element.

12. A filter-demulsifier element comprising a perforated core, a plurality of layers of nylon-resin material wrapped around said core, said material having one side which is more loosely packed than the other side and being arranged in said layers so that the loosely packed side of each layer contacts the more tightly packed side of the adjacent layer.

References Cited in the file of this patent

UNITED STATES PATENTS

| | | |
|---|---|---|
| 1,893,048 | Birkholz | Jan. 3, 1933 |
| 2,076,980 | Cooper | Apr. 13, 1937 |
| 2,196,821 | Arnold | Apr. 9, 1940 |
| 2,201,650 | Lahherberg | May 21, 1940 |
| 2,266,882 | Lowther | Dec. 23, 1941 |
| 2,345,848 | Winslow | Apr. 4, 1944 |
| 2,368,024 | Himmell | Jan. 23, 1945 |
| 2,539,768 | Anderson | Jan. 30, 1951 |
| 2,609,932 | Fricke | Sept. 9, 1952 |
| 2,626,214 | Osborne | Jan. 20, 1953 |
| 2,670,851 | Curtis | Mar. 2, 1954 |
| 2,707,563 | Kasten et al. | May 3, 1955 |
| 2,725,271 | Cunningham | Nov. 29, 1955 |